Oct. 17, 1967  J. P. MORGAN, JR  3,347,292
HAND SAW AND HANDLE
Filed Dec. 30, 1965

INVENTOR
JAMES P. MORGAN JR.

BY
ATTORNEY

United States Patent Office 3,347,292
Patented Oct. 17, 1967

3,347,292
HAND SAW AND HANDLE
James P. Morgan, Jr., York, Pa., assignor to Pennsylvania Saw Corporation, York, Pa., a corporation of Pennsylvania
Filed Dec. 30, 1965, Ser. No. 517,718
1 Claim. (Cl. 145—31)

ABSTRACT OF THE DISCLOSURE

A handsaw having a handle provided with a closed arcuate slot-like finger-receiving opening extending transversely to the axis of the blade to form a curved grip having similar, concavely rounded shallow grooves of equal length and shape directly opposite each other and generally parallel to the upper edge of the handle and arranged respectively to receive the thumb and forefinger of the user's hand when gripping the handle selectively either with the right or left hand in normal use to improve the comfort of gripping the saw and also the control thereof to guide the saw in use.

---

This application is a continuation-in-part application of Ser. No. 498,283, filed Oct. 20, 1965, and now abandoned.

While the type of saw and handle to which the present invention preferably pertains comprises a carpenter's saw, it is to be understood that the invention also is applicable especially to the handles of at least certain types of saws adapted for other uses than carpentry.

For many years, the conventional handle for most types of hand saws has comprised either a handle made from wood, or, in more recent years, some have been molded from suitable compositions. Such handles are provided with a slot or opening extending substantially vertically in use and defining a grip member extending between the upper and lower extremities of the saw handle. In use, the hand of the person gripping the saw is disposed with the thumb and forefinger extending along the opposite surfaces of the upper portion of the grip member of the handle, while the remaining three fingers were curved around the grip. According to preferred practice, the index finger usually extends straight, and forwardly, along the outer surface of the saw handle adjacent the upper edge thereof.

By gripping a saw handle in the manner described above, reasonably effective control of the position of the saw with respect to a workpiece can be achieved, but it has been found that both the comfort of gripping the saw handle and using the saw, as well as controlling the operation and position of the saw with respect to the work can be improved by adopting the principles of the present invention.

It is the principal object of the present invention to provide relatively simple, inexpensive, yet highly effective, means for improving both the comfort of gripping a saw handle as well as improving the control of the position of the saw by the user with respect to the work through the provision of relatively shallow grooves formed in the opposite outer surfaces of the grip member of a saw handle adjacent the upper end thereof and extending substantially parallel to the upper surface of the handle, said grooves respectively being positioned conveniently to receive the thumb and forefinger of the hand of a user when gripping the handle in normal use of the saw.

It is another object of the invention to form the aforementioned shallow grooves in the opposite sides of the upper portion of the grip member of the saw handle but also form an extension of such grooves in the opposite sides of the upper portion of the forward part of the handle, in axial alignment with the grooves in the upper portion of the grip member to receive the tip portion of the forefinger of the hand of the user when gripping said saw handle and thereby afford additional control of the saw over that afforded by the grooves in the upper portion of the grip member per se.

It is a further object of the invention to curve the opposite ends of said grooves in the upper portion of the grip member inwardly toward the central plane of the handle so as to merge the same with the curved surfaces of the grip member that are provided on the forward and rearward surfaces of said grip member, thereby affording additional ease and comfort of gripping the saw handle by the user.

Details of the foregoing objects and of the invention, as well as other objects thereof, are set forth in the following specification and illustrated in the drawing comprising a part thereof.

Figure 2:
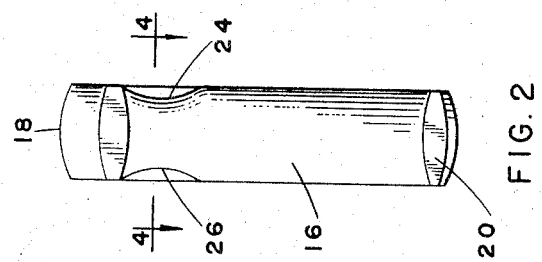
FIG. 2 is a rear end view of the saw handle shown in FIG. 1.
Figure 4:
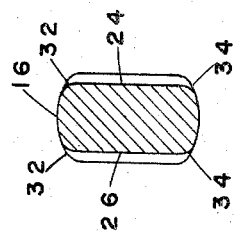
FIG. 4 is a transverse sectional view of the grip member per se of the handle of the saw shown in the preceding figures, as viewed on the line 4—4 of FIG. 2.
Figure 1:
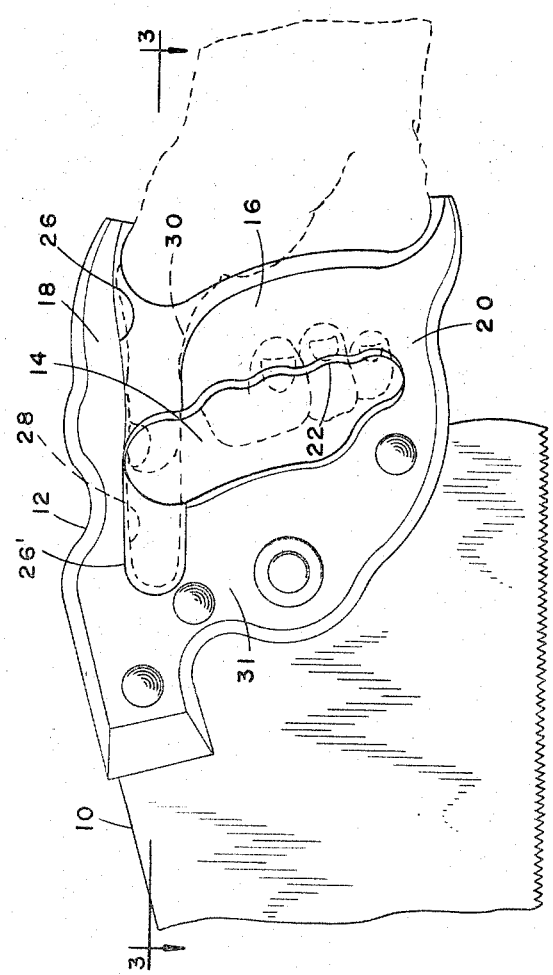
FIG. 1 is a fragmentary rear end portion of a conventional hand saw, illustrated in exemplary manner, and showing a handle affixed to the saw and embodying the principles of the invention, the advantages of the improvements being illustrated by showing a human hand in phantom in engagement with the handle.
Figure 3:
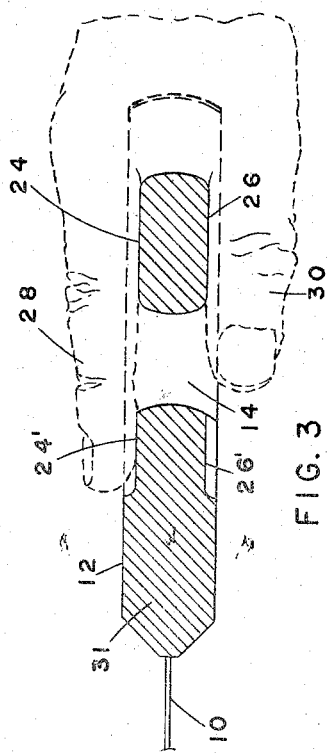
FIG. 3 is a fragmentary longitudinal sectional view of the saw and handle illustrated in FIGS. 1 and 2, as seen on the line 3—3 of FIG. 1, and also showing in phantom a fragmentarily illustrated exemplary human hand.

Referring to the figures, and especially FIGS. 1 and 3, it will be seen that a fragmentarily illustrated, conventional saw blade 10 has a handle 12 secured thereto by conventional means, it being understood that the handle 12 may be formed from any suitable material, including wood, appropriate plastics materials, or otherwise. The present invention primarily is concerned with details of the shape of the handle, as distinguished from the material from which it is formed.

The handle 12 is provided with an elongated finger-receiving opening or slot 14 which defines a grip member 16 which, in normal use, extends substantially vertically and is disposed between the upper and lower extremities 18 and 20 of the handle 12. The forward edge of the grip member 16 preferably is somewhat sinuous in order to provide rounded notches 22 respectively to receive the fingers of the hand of the user with the exception of the forefinger.

In accordance with the principles of the present invention, the opposite surfaces of the upper portion of the grip member 16 are each provided with similar, preferably shallow grooves 24 and 26 which extend substantially parallel to the upper surface of the handle. As is especially evident from FIGS. 1 and 3, the groove 24 is arranged to receive, firmly and effectively, the inner surface of the root portion of the index finger 28 of the hand of the user, while the groove 26, equally firmly and comfortably, receives the inner surface of the root portion of the thumb 30 of the user.

The provision of the grooves 24 and 26 and reception of the index finger and thumb of the hand of the user respectively therein improves the comfort by which the user may engage the saw handle due to the curved surfaces of the grooves 24 and 26 more closely conforming, in a complementary manner, to the convex surface of the user's index finger and thumb. Further, by such an arrangement, improved and effective alignment of the user's index finger and thumb with respect to the saw handle is provided which greatly contributes to the user's ability to control the position of the saw with respect to a workpiece. In short, the present invention much more closely conforms a saw handle to the natural shape of the user's hand when gripping the handle than has been possible with handles previously provided on hand saws. Squeezing the grip member primarily between the thumb and forefinger effects positioning and control of the saw and the grooves 24 and 26 lend both comfort and accuracy to said gripping effect. The grooves 24 and 26 also preferably are identical and opposite each other, whereby either a right-handed or left-handed person may use the saw and handle with equal facility.

Additional comfort and, particularly, improved control is afforded in addition to the foregoing structure by providing in the opposite sides of the upper portion of the forward part 31 of handle 12 extension grooves 24' and 26' which, as seen from FIGS. 1 and 3, respectively are in axial alignment with and forwardly of grooves 24 and 26 formed in the upper portion of grip member 16. The extension grooves 24' and 26' are of limited length and effectively receive respectively and with equal facility the tip portions of the forefingers of either a right-handed or left-handed person, when gripping the saw handle in accepted manner.

Additional improvement also is afforded by the present invention in view of the fact that the opposite ends 32 and 34 of the grooves 24 and 26 are curved inwardly toward the central plane of the handle, said curved ends merging with the curved forward and rearward surfaces of the grip member 116, thereby eliminating any sharp edges or corners at the opposite ends of said grooves, whereby even greater comfort and closer conformity of the grip member of the handle to the user's hand is provided.

From the foregoing, it will be seen that through the relatively simple expedient of providing shallow, curved grooves in the opposite surfaces of the upper portion of the grip member and forward part of a saw handle, highly improved results both as to comfort and control of the saw in use are provided in comparison with conventional saw handles. Certain of these grooves are located at the portion of the handle where a squeezing action is effected between the forefinger and thumb of the user, while the groove extensions are located to receive the tips of the forefingers of the user especially to cooperate with the other grooves and effect improved control and direction of the saw during use.

While the invention has been described and illustrated in its several preferred embodiments, it should be understood that the invention is not to be limited to the precise details herein illustrated and described since the same may be carried out in other ways falling within the scope of the invention as claimed.

I claim:

In a hand saw including a handle of substantially uniform thickness throughout and of the type having a closed arcuate finger-receiving slot-like opening extending generally transversely to the longitudinal axis of the saw and defining a curved grip member substantially as thick as said handle and extending between the normally upper and lower extremities of the handle, the improvement comprising similar concavely rounded shallow grooves of equal depth and shape formed directly opposite to each other respectively in the outer surfaces of the upper end of said grip member and extending substantially parallel to each other and the upper surface of said handle, whereby the thickness of the grip member between the bottoms of said grooves is less than the thickness of all other portions of said gripping member, the forward and rearward surfaces of said grip member also being additionally curved in directions transverse to the plane of said handle to provide comfortably rounded gripping surfaces for the hand of the user and the opposite ends of said grooves also being curved inwardly toward the central plane of said handle to merge with said additional curved surfaces of said grip member, and additional shallow concavely rounded grooves of limited length being formed directly opposite each other in the opposite surfaces of the upper portion of the part of said handle immediately forward of said arcuate finger-receiving slot-like opening and in axial alignment with said concavely rounded grooves in said opposite outer surfaces of the grip member to receive the tip portion of the index finger of the user and said grooves all respectively being positioned and serving conveniently to receive the thumb and forefinger of a human hand when gripping the handle selectively either with the right or left hand of the user in normal use of the saw.

References Cited

UNITED STATES PATENTS

D. 122,704  9/1940  Wickbergh.
D. 152,760  2/1949  Weaver _____ 145—31 X
1,503,251  7/1924  Schoof.

FOREIGN PATENTS 73,402  10/116  Switzerland.

WILLIAM FELDMAN, *Primary Examiner.*

R. V. PARKER, JR., *Assistant Examiner.*